Dec. 8, 1931.  A. AUDET  1,834,927

SUNKEN CUSPIDOR

Filed July 8, 1931  2 Sheets-Sheet 1

Inventor:
Alfred Audet,
by Calver Kalver
Attys.

Dec. 8, 1931.  A. AUDET  1,834,927
SUNKEN CUSPIDOR
Filed July 8, 1931  2 Sheets-Sheet 2
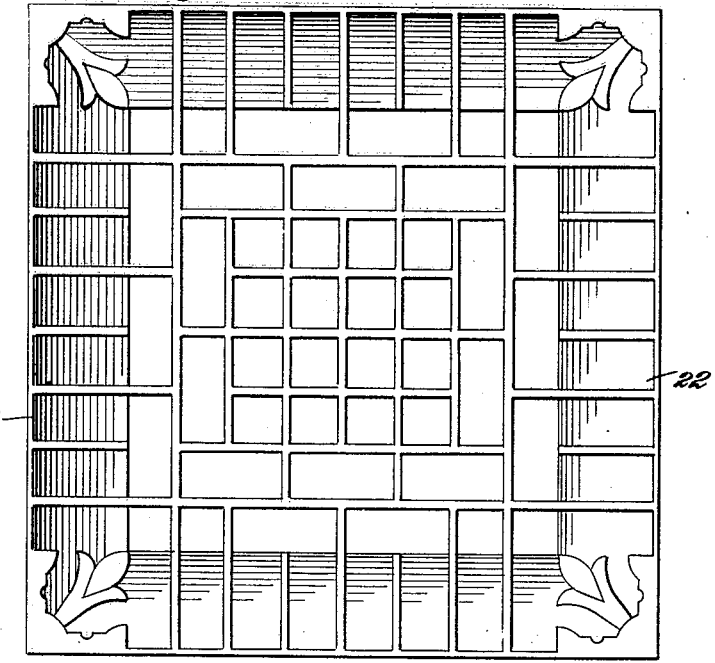
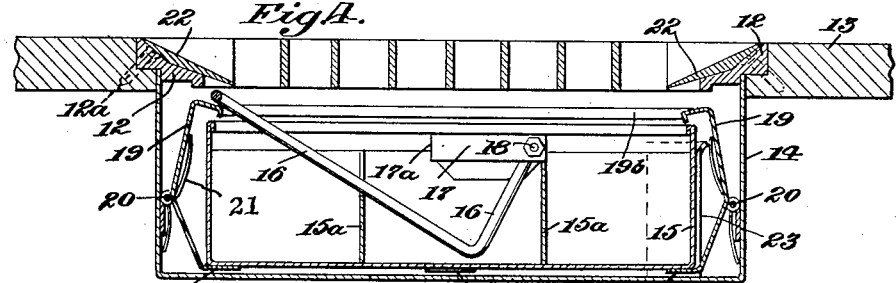
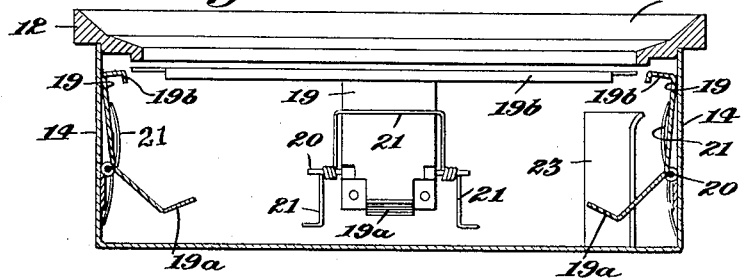
Inventor:
Alfred Audet,
by Calvert Calvert
Att'ys.

Patented Dec. 8, 1931

1,834,927

UNITED STATES PATENT OFFICE

ALFRED AUDET, OF SALEM, MASSACHUSETTS

SUNKEN CUSPIDOR

Application filed July 8, 1931. Serial No. 549,553.

This invention relates to a sunken cuspidor of that class which is adapted to be set down into the floor of a building or a travelling vehicle or boat, and it has for its object to provide a convenient device of this character, and which comprises a removable receptacle or pan.

Figure 1:
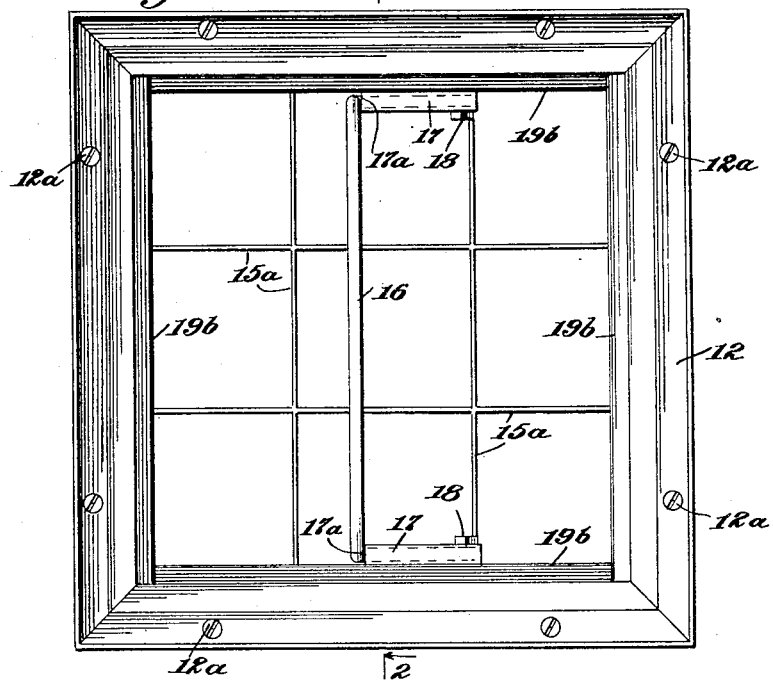
Figure 2:
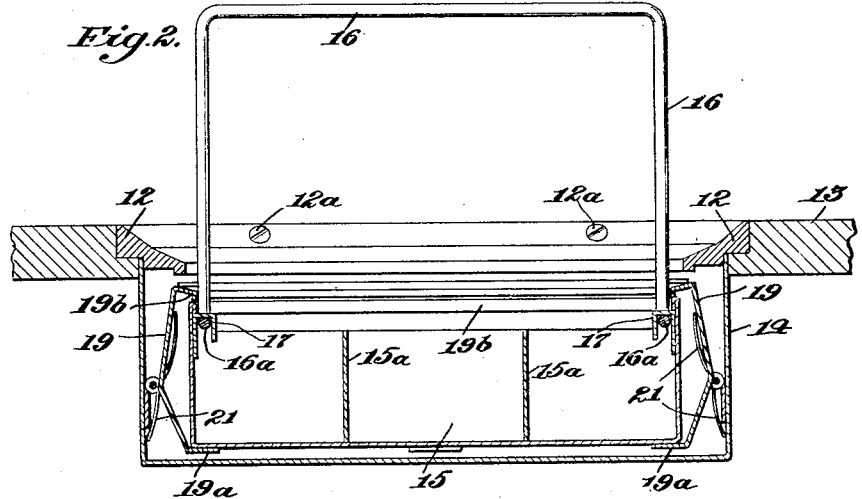

In the accompanying drawings Fig. 1 is a plan view of the improved cuspidor with the grill top or cover removed and with the bail of the receptacle or pan lifted. Fig. 2 is a sectional view of the same on line 2—2, Fig. 1. Fig. 3 is a plan view of the removable grill cover. Fig. 4 is a sectional view similar to Fig. 2 with the pivoted bail lowered to the position which it will normally occupy. Fig. 5 is a plan view similar to Fig. 4 but with the receptacle or pan removed.

Referring to the drawings 12 denotes a rectangular metal frame adapted to be set down into and attached to a floor 13. Soldered or otherwise suitably attached to the frame 12 is a rectangular casing 14 adapted for the reception of a removable receptacle or pan 15 which is provided with a pivoted bail 16, which is normally turned down within the receptacle or pan 15, as shown in Fig. 4, but which may be lifted to the position shown in Figs 1 and 2 when the pan 15 is to be removed from or replaced in the casing 14.

The bail 16 comprises short arms 16ª extending at right angles to the side elements of the said bail, and when the bail is lifted these arms 16ª will be housed in hollow or trough-shaped brackets 17 the ends 17ª of which serve as stops to limit the upward swinging movement of the bail on its pivot bolts 18.

Pivotally mounted on the inner faces of the casings 14 are guards 19 the upper inturned flanges 19ᵇ of which are adapted to slightly overlap the upper edges of the receptacle or pan 15 when the said receptacle or pan is in the position shown in Figs. 2 and 4. These guards are constructed with inturned lower ends 19ª which extend beneath the receptacle or pan 15 when the latter is in place as shown in Figs. 2 and 4. Attached to the pivot pins 20 of the guards 19 are spring devices 21 comprising bails pressing against the inner faces of the said guards and thus serving to hold the said guards outward in the positions shown in Fig. 5 when the receptacle or pan 15 is removed; but when the said receptacle or pan is being placed within the casing 14 its bottom will strike against the inturned parts 19ª of the said guards and will cause the inturned upper parts or flanges 19ᵇ of the said guards to be moved inward to the positions shown in Figs. 2 and 4, and in such positions the flanges 19ᵇ will overlap the upper edges of the receptacle or pan 15 and will thus prevent any liquid or other matter which may be injected into the cuspidor from getting into the chamber of the casing 14 outside of the receptacle or pan 15.

Fitting loosely in the frame 12, the upper surface of which is preferably beveled as shown in Figs. 2 and 4, is a heavy openwork cover or grill 22 which rests on the frame 12, its outer sides being bevelled to fit within the said frame with its upper surface flush with the floor 13. This openwork grill or cover is preferably made of cast metal, such as bronze or brass, and is preferably of an ornamental character, as will be understood from Fig. 3. Being of considerable weight the said grill cover will be held in place by gravity, but may be readily removed when the receptacle or pan 15 is to be placed in or removed from the casing 14.

It is usual to put more or less water in cuspidor receptacles, and as the cuspidor of the present invention is intended for use on ships or travelling land or air vehicles the movements of which might tend to cause any water which may be placed in the receptacle or pan 15 to slop over, the said receptacle or pan is preferably provided with partitions 15ª which will serve to check the slopping movements of water within the said receptacle or pan 15.

To assist in positioning the receptacle or pan within the casing 14, in locating the said receptacle or pan in place, vertical guides 23 are soldered or otherwise suitably attached to the casing 14. Two of these guides, located at diagonally opposite corners of the said casing, will be sufficient to assist in locating the receptacle or pan 15 in place, but more can be provided if it should be found desirable or necessary.

From the foregoing it will be understood that the invention provides a convenient cuspidor device comprising a receptacle or pan which can be readily placed in or removed from a sunken casing or holder which may be attached to a floor, as by screws 12$^a$.

The invention is not to be understood as being limited to the details described and shown, as such details may be greatly varied, within the province of mechanical skill, without departing from the essence of the invention as set forth in the claims hereunto appended.

Having thus described my invention I claim and desire to secure by Letters Patent:

1. A sunken cuspidor comprising a frame adapted for attachment to a floor, a depending casing attached to said frame, a removable pan fitting loosely within said casing, a weighted openwork cover or grill resting on said frame, pivoted guards within said casing and having flanged upper parts, said guards having in-turned lower end parts to be engaged by the bottom of said pan, when placed within said casing, to cause said flanged parts to overlap the upper edges of said pan, and spring devices for holding said flanged parts of said guards outward when said pan is removed.

2. A sunken cuspidor comprising a frame adapted for attachment to a floor, a depending casing attached to said frame, a removable pan fitting loosely within said casing, a weighted openwork cover or grill resting on said frame, pivoted guards within said casing and having flanged upper parts, said guards having in-turned lower end parts to be engaged by the bottom of said pan, when placed within said casing, to cause said flanged parts to overlap the upper edges of said pan, and spring devices for holding said flanged parts of said guards outward when said pan is removed, said casing having internal vertical guides to properly position said pan.

In testimony whereof I affix my signature.

ALFRED AUDET.